H. H. BEACH.
COMBINED SIFTER AND SHOVEL.
APPLICATION FILED MAY 27, 1919.

1,398,666.

Patented Nov. 29, 1921.

INVENTOR
HERBERT HENRY BEACH
By
Attorney

UNITED STATES PATENT OFFICE.

HERBERT HENRY BEACH, OF BALHAM, LONDON, ENGLAND.

COMBINED SIFTER AND SHOVEL.

1,398,666.  Specification of Letters Patent.  Patented Nov. 29, 1921.

Application filed May 27, 1919. Serial No. 300,125.

*To all whom it may concern:*

Be it known that I, HERBERT HENRY BEACH, a subject of the King of Great Britain and Ireland, and a resident of Balham, county of London, England, have invented a certain new and useful Improvement in Combined Sifters and Shovels, of which the following is a specification.

This invention relates to a combined sifter and shovel for household or other use, applicable for cinders, coal, or other materials. The device comprises a shovel with a permanent sifter bottom, and a false solid bottom, the latter operable by convenient means to open and bring into operation the sieve. When the false bottom is in the normal (closed) position, the device can be used as an ordinary shovel.

Numerous ways of carrying into effect an appliance constructed in accordance with the foregoing are possible, and a preferable construction is hereinafter described and illustrated in the accompanying sheet of drawings, wherein:—

Like letters of reference indicate corresponding parts in the two views.

Figure 1:
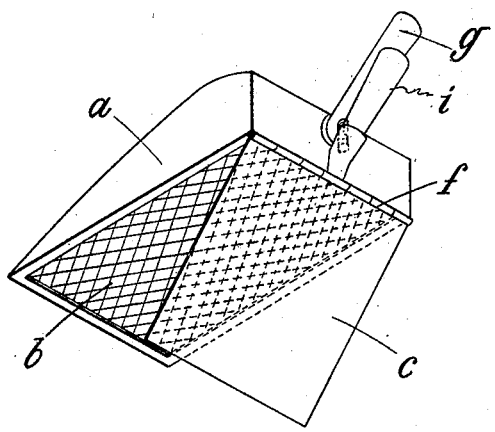
Figure 1 is a perspective view of the invention.

In carrying the present invention into effect it is proposed to provide a shovel body $a$, the same having the permanent sieve portion $b$ attached thereto. This sieve portion has arranged on one side thereof, and co-extensive therewith the perforated bottom $c$, the same being arranged to be manipulated in such a manner as to cover and uncover the sieve $b$, as shown in the drawings.

Figure 2:
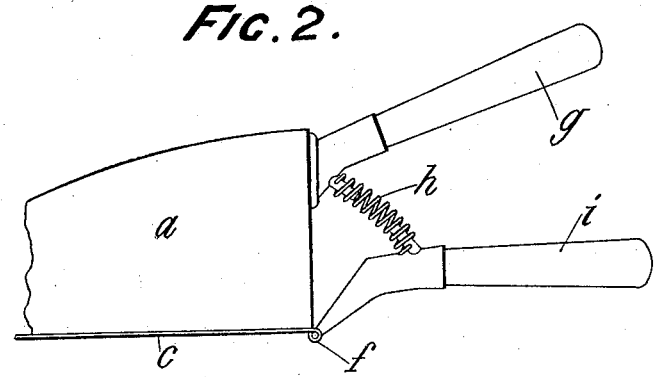
Fig. 2 is a fragmentary side view of Fig. 1, false bottom closed.

In the form illustrated in Figs. 1 and 2, the false bottom $c$ is hinged at $f$ to the under surface of the shovel $a$. The hinge is disposed near the handle $g$ and the bottom provided with a spring closure such as $h$, so that by merely gripping and pressing together a handle $i$ on the bottom $c$ and the shovel handle $g$, the bottom $c$ is opened.

Variations in the construction of the combination article may be made without departing from the principle of the said invention.

Having now described my invention, what I claim as new and desire to secure by Letters Patent of the United States is:—

A combined sifter and shovel including a shovel body having a screened bottom permanently fitted thereto, a handle carried by the shovel body, a false bottom hinged to the rear edge of the shovel body and co-extensive with the said screened bottom portion thereof, a handle carried by said false bottom and extending to one side of the hinging axis, and a spring confined between the handle on the shovel body and the said handle on the false bottom to maintain the latter in a normally closed position.

In testimony whereof I have affixed my signature hereto this 2nd day of May, 1919.

HERBERT HENRY BEACH.